United States Patent [19]
Hebert

[11] Patent Number: 5,926,318
[45] Date of Patent: Jul. 20, 1999

[54] BIOCULAR VIEWING SYSTEM WITH INTERMEDIATE IMAGE PLANES FOR AN ELECTRONIC DISPLAY DEVICE

[75] Inventor: Raymond T. Hebert, Los Gatos, Calif.

[73] Assignee: Optimize Incorporated, Los Gatos, Calif.

[21] Appl. No.: 09/056,934

[22] Filed: Apr. 6, 1998

[51] Int. Cl.$^6$ .................................................. G02B 27/10
[52] U.S. Cl. .......................... 359/618; 359/630; 359/633; 359/40; 359/464; 345/8; 348/53
[58] Field of Search .................... 359/618, 629, 359/630, 633, 464, 466, 475, 458, 40; 345/8; 348/53, 56, 55

[56] References Cited

U.S. PATENT DOCUMENTS

| 4,563,061 | 1/1986 | Ellis | 350/503 |
|---|---|---|---|
| 4,697,922 | 10/1987 | Gunter, Jr. et al. | 359/618 |
| 4,786,966 | 11/1988 | Hanson et al. | 358/108 |
| 4,884,137 | 11/1989 | Hanson et al. | 358/108 |
| 4,918,699 | 4/1990 | Boyd et al. | 359/618 |
| 4,969,730 | 11/1990 | van den Brandt | 353/31 |
| 4,970,589 | 11/1990 | Hanson et al. | 358/108 |
| 5,005,213 | 4/1991 | Hanson et al. | 455/617 |
| 5,034,809 | 7/1991 | Katoh | 359/466 |
| 5,129,716 | 7/1992 | Holakovszky et al. | 351/50 |
| 5,164,848 | 11/1992 | Firth et al. | 359/13 |
| 5,189,452 | 2/1993 | Hodson et al. | 359/629 |
| 5,200,827 | 4/1993 | Hanson et al. | 358/211 |
| 5,347,400 | 9/1994 | Hunter | 359/815 |
| 5,392,158 | 2/1995 | Tosaki | 359/633 |
| 5,452,733 | 9/1995 | Sterman et al. | 128/898 |
| 5,467,205 | 11/1995 | Kuba et al. | 359/40 |
| 5,596,454 | 1/1997 | Hebert | 359/726 |
| 5,619,373 | 4/1997 | Meyerhofer et al. | 359/482 |
| 5,644,323 | 7/1997 | Hildebrand et al. | 345/8 |
| 5,654,749 | 8/1997 | Kanno | 348/56 |
| 5,682,173 | 10/1997 | Holakovszky et al. | 345/8 |
| 5,695,504 | 12/1997 | Gifford, III et al. | 606/153 |

OTHER PUBLICATIONS

Heacock et al., Viewing Ocular Tissues with A Stereoscopic Endoscope Coupled to a Head Mounted Display (HMD), http://www.hitl.washington.edu/publications/heacock/, Feb. 17, 1998, 7 pages.
Jenkins, F.A. & White, H.E., *Fundamentals of Optics*, (McGraw–Hill, New York, 3rd ed., 1957) pp. 182–183.
"Feedback Control System", *The Photonics Dictionary*, Laurin Publishing Co., Inc., Pittsfield, MA, 1988, p. D–42.
"Press Release," Kaiser Electro–Optics, Inc., Carlsbad, CA, Feb. 2, 1998, 5 pages.
Tektronix, Inc., Beaverton, OR, "SGS 430 System", 1987.
VRex, (Elmsford, NY), "Wireless stereoscopic eyewear", product releases: Stereospace Model 1™, PCVR™, Kasan 3DMAX™, Model DMM StereoPlate from 3DTV Corp (1996).

Primary Examiner—Loha Ben
Attorney, Agent, or Firm—Skjerven, Morrill, MacPherson, Franklin & Friel LLP; David E. Steuber; William B. Tiffany

[57] ABSTRACT

Low-cost complex plastic optics allow biocular viewing of video images generated by a single electro-optic display device, such as in a head-mounted display (HMD) for commercial or medical viewing applications. A dual off-axis configuration uses nearly collimated illumination optics and intermediate imaging optics to fill both eyepieces from a single display device without the need for a beamsplitter. Multiple illumination schemes are provided for either monochrome or color, and in either two-dimensional or time-sequential true stereographic presentation. Light from multicolor sources is superimposed, mixed, and homogenized by mixing light cones with diffractive collectors. Offsetting color overcorrection and undercorrection of individual optical elements achieves overall chromatic correction with minimal optical element complexity. A wireless video signal interface eliminates excess cabling. Additional features include lightweight achromatic eyepiece construction and interchangeable lenslets for peripheral vision correction. Multiple optical elements are injection-molded as a unitary plastic structure, thereby reducing cost and complexity.

80 Claims, 8 Drawing Sheets

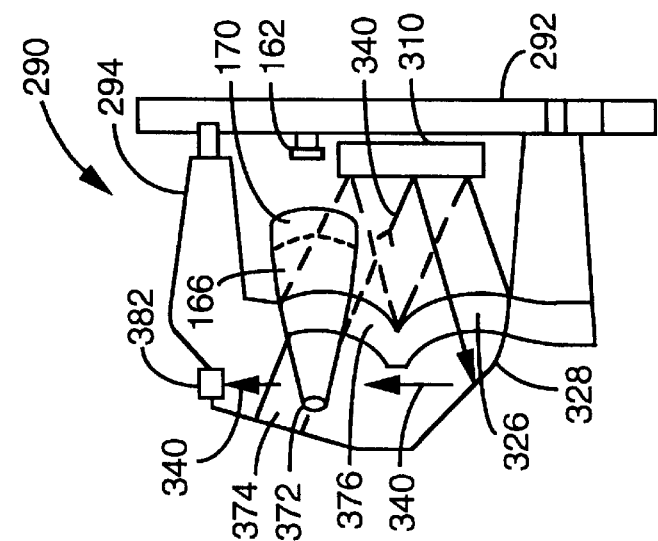
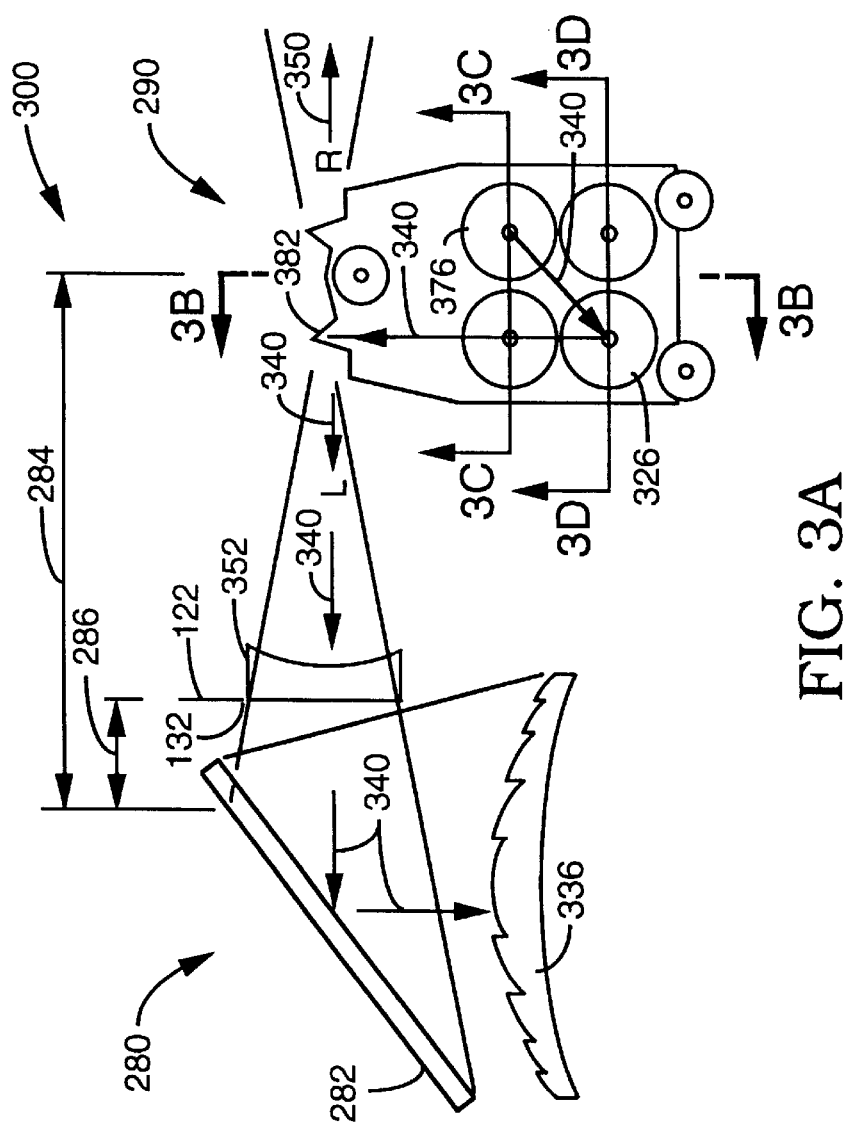
FIG. 3B
FIG. 3A

BIOCULAR VIEWING SYSTEM WITH INTERMEDIATE IMAGE PLANES FOR AN ELECTRONIC DISPLAY DEVICE

FIELD OF THE INVENTION

The invention relates generally to image display systems and more particularly to dual off-axis stereographic systems with multiple illumination sources for biocular viewing of single microdisplays.

BACKGROUND

High quality, convenient, cost-effective medical remote imaging has gained increasing importance during recent years. This is particularly true of imaging during surgical procedures, most importantly minimally invasive procedures in which direct viewing of the surgical field by the surgeon is difficult. For example, a method for performing coronary artery bypass relies on viewing the cardiac region through a thoracoscope or other viewing scope (see for example Sterman et al. U.S. Pat. No. 5,452,733 and Gifford, III et al. U.S. Pat. No. 5,695,504). By way of further example, a surgeon may need to perform a delicate vascular- or neuro-microsurgical reconstruction through a minimal incision with the aid of remote viewing. Minimally invasive surgical procedures and their related need for remote imaging are now common in orthopedics, ophthalmology, urology, gynecology, anesthesiology, and other medical disciplines.

In a conventional surgical environment, remote imaging is accomplished by attaching a video camera to an endoscope, laparoscope, or other minimally invasive instrument and transmitting the video image via cable to a conventional CRT video monitor. This is typically cumbersome in a crowded, brightly lighted operating room, where surgical team members are frequently milling around and the surgeon's view of the image screen is often obstructed. Additionally, the CRT monitor is incapable of providing the surgeon with critical depth perception, since it is not stereographic.

Head-mounted displays (HMDs) potentially offer a method for convenient medical remote viewing without obstruction of the image by the clutter typical of the operating room. While head-mounted displays have been designed, developed and deployed in military applications for many years, such displays are generally bulky, expensive, application-specific devices that are not well suited to commercial or surgical applications.

With the advent of inexpensive and increasingly complex commercial computing power and computer graphic devices and software, there has been increasing interest and activity in the field of commercial HMD devices. A number of such devices are presently available, but because of the high cost of appropriate display components and the generally cumbersome mechanical nature of the headgear, these devices are generally low in resolution and unattractive for professional computing applications.

High-resolution display device components are now emerging, that can significantly enhance commercial HMDs and related applications. However, they require integration into an ergonomic, well engineered and economical design. In the case of professional and consumer computing applications, visual quality and comfort are critical to long-term acceptance. A computing environment generally includes the use of a keyboard as well as peripheral devices and supporting paperwork. Therefore peripheral vision is also an important consideration.

A compact HMD system requires a very small display device, such as those found in modern camcorder viewfinders, but with significantly higher resolution. A number of such devices are now becoming available, including transmissive and reflective liquid-crystal microdisplay devices and micro-mirror devices having resolutions at or in excess of VGA quality (640 pixels by 480 pixels) with pixel sizes on the order of 15 microns or less. Most of these devices exhibit satisfactory image contrast only when illuminated and viewed at narrow angles of incidence, which compromises field of view, eye relief, and viewing comfort.

Due to the base costs of their materials, such devices are expensive for commercial applications, even in high volumes. In particular, for stereographic or other binocular applications, the use of dual display devices for two eye channels results in a high cost. A medical stereographic HMD system having dual display devices is described in Heacock et al. "Viewing Ocular Tissues with A Stereoscopic Endoscope Coupled to a Head Mounted Display (HMD)," http://www.hitl.washington.edu/publications/heacock/, Feb. 17, 1998.

Kaiser Electro-Optics (2752 Loker Avenue West, Carlsbad, Calif. 92008 manufactures the "CardioView," "Series 8000," and "StereoSite" HMD display systems for Vista Medical Technologies. These systems are bulky, heavy, and expensive, and include two LCD display devices. For peripheral vision correction they require the user to wear the HMD over conventional corrective eyeglasses, aggravating user inconvenience and discomfort.

Attempts to use only a single display device for such applications have typically involved beamsplitters, and have not achieved true stereographic performance (see for example Meyerhofer et al. U.S. Pat. No. 5,619,373, issued Apr. 8, 1997).

Therefore, what is needed in the art is a compact, high resolution, high contrast, truly stereographic system for microdisplay viewing, particularly for surgical microdisplay viewing, that is suitable for head-mounted display use without requiring undue complexity or expense. The system should provide good color fidelity for color image viewing, and should incorporate ergonomic design for comfort and efficiency, including peripheral vision accommodation and minimal cabling.

SUMMARY OF THE INVENTION

In accordance with the invention, true stereographic viewing is achieved using a single display device with appropriate less expensive optics and without a beamsplitter. Low-cost complex plastic optics allow biocular viewing of a single electro-optic display device, such as for use in a head-mounted display (HMD). A dual off-axis configuration provides two independent optical channels, intersecting only at the image surface of the display device. Each optical channel contains its own illumination source, eyepiece lens, and imaging optics. In some embodiments, nearly collimated illumination optics and intermediate field lenses are used to fill wide-aperture eyepieces without the need for a beamsplitter.

Multiple illumination schemes are provided for either monochrome or color, and in either two-dimensional or time-sequential true stereographic presentation. In some embodiments, true stereographic performance is achieved by sequential activation of the light sources in the two channels in synchronism with sequential video signals for the respective channels. Offsetting color overcorrection and undercorrection methods are applied to minimize optical element complexity. Additional features include lightweight eyepiece construction and interchangeable lenslets for peripheral vision correction.

Some embodiments include a video interface, which converts conventional RGB-VGA formatted video signals to sequential color data for storage in intermediate refresh frame memory. Some versions of the video interface incorporate wireless transmission, eliminating cumbersome cabling.

Therefore, in some embodiments of the invention, a compact, high resolution, high contrast, truly stereographic system is provided for microdisplay viewing, that is suitable for head-mounted display use without requiring undue complexity or expense. The system provides color correction for good color fidelity, and incorporates ergonomic features for comfort and efficiency, including peripheral vision accommodation. Wireless versions eliminate the need for cumbersome cabling. Particularly, high resolution, high color fidelity, truly stereographic viewing in a head-mounted display, including peripheral vision accommodation and wireless transmission, provides the depth perception and convenience required for surgical remote viewing.

BRIEF DESCRIPTION OF THE DRAWINGS

FIGS. 3A–3D are cross-sectional views of a folded optical path, reflective display biocular system;

DETAILED DESCRIPTION OF THE EMBODIMENTS

The invention relates generally to image display systems and more particularly to dual off-axis stereographic systems with multiple illumination sources for biocular viewing of single microdisplays.

In some embodiments of the invention, a compact biocular optical configuration provides a wide-angle image of a single display surface independently to each eye.

Figure 1:
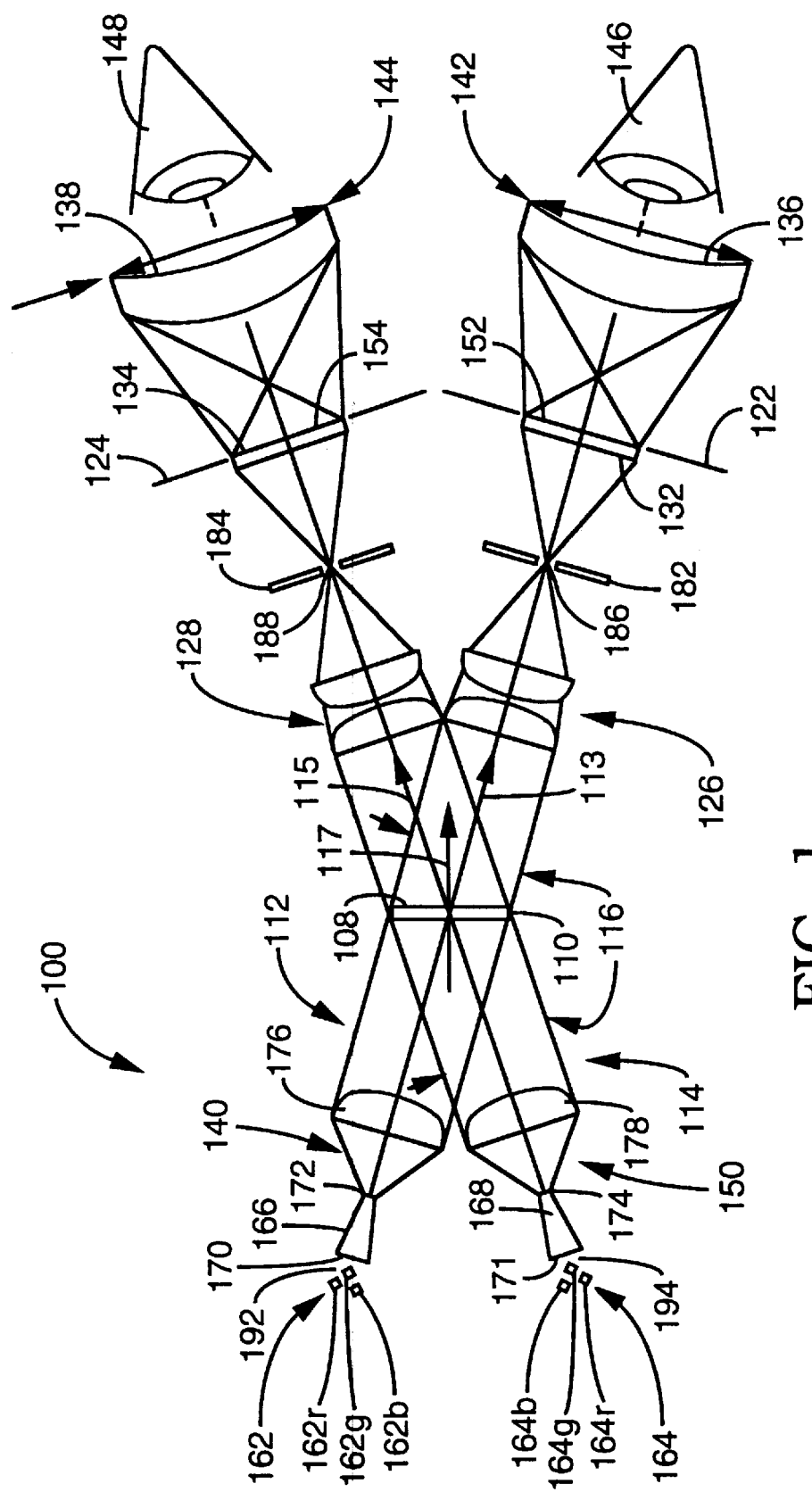
FIG. 1 is a schematic view of an unfolded optical path off-axis biocular system, in accordance with the invention.

FIG. 1 is a schematic view of an unfolded optical path off-axis biocular system 100, in accordance with the invention, incorporating a single transmissive display device 110 having a substantially planar display surface 108, as described in detail below. Display device 110 is positioned at the intersection of two independent beams 112 and 114 of nearly collimated light, defining respective substantially rectilinear beam axes 113 and 115. In some embodiments of the invention, independent beams 112 and 114 are individually produced from a single or multiple light sources, as described in greater detail below. Independent beams 112 and 114 preferably each have collimated beam width (e.g. diameter 116) approximately equal to the width (e.g. diameter) of display surface 108 projected onto planes perpendicular to respective beam axes 113, 115. Beam axes 113 and 115 are tilted relative to one another and to a display axis 117 perpendicular to display surface 108.

Independent beams 112 and 114 propagate through display surface 108 along respective beam axes 113 and 115 to respective intermediate image planes 122 and 124. Single or multiple imaging elements 126 and 128 form intermediate images 132 and 134 of display surface 108 in space at intermediate image planes 122 and 124 respectively. In some embodiments, imaging elements 126 and 128 incorporate toroidal optical correction to correct for off-axis geometric distortion.

Intermediate image planes 122 and 124 are re-imaged by respective independent eyepiece lenses 136 and 138, configured to magnify intermediate image planes 122 and 124 respectively and to provide virtual images (not shown) for independent viewing by each eye 146, 148 of an observer. Because of the collimated nature of independent beams 112 and 114 at display surface 108 and the specific paths of the resultant beams through intermediate image planes 122 and 124, the optical energy of respective independent beams 112 and 114 does not fill the eyepiece apertures 142, 144. It has long been recognized by those having ordinary skill in the art, that optical energy must fill eyepiece apertures 142, 144 sufficiently in order to provide complete and uniform virtual images to the eyes 146, 148 of an observer.

In some embodiments, this condition is met in a traditional manner by inserting a field lens 152, 154 (see for example F. A. Jenkins and H. E. White: "Fundamentals of Optics," McGraw-Hill New York, Toronto, London 3rd edition 1957, pp. 182–183) along beam axis 113, 115 at or near intermediate image plane 122, 124 to fill its respective eyepiece aperture 142, 144 for all possible fields of view. By definition, field lenses as described herein optionally include scattering screens and Fresnel lenses (see for example The Photonics Dictionary 1988, Laurin Publishing Co., Inc., Pittsfield, Mass.). In some embodiments, field lens 152, 154 is given on-axis or off-axis toroidal power to correct residual image distortions and/or to accommodate the field curvature of the eyepiece design.

Independent beam 112 propagating along beam axis 113, together with intermediate imaging plane 122, imaging element 126, eyepiece lens 136, eyepiece aperture 142, and any other optical elements lying along independent beam 112 are defined collectively as left optical channel 140. Likewise independent beam 114 propagating along beam axis 115, together with intermediate imaging plane 124, imaging element 128, eyepiece lens 138, eyepiece aperture 144, and any other optical elements lying along independent beam 114 are defined collectively as right optical channel 150. Left and right optical channels 140 and 150 intersect one another only at the display device 110. Off-axis biocular system 100 avoids the loss of light, bulk and expense of conventional beamsplitters, but illumination off-axis relative to of display axis 117 induces geometric distortion of the image of display surface 108, which must be accommodated or compensated. Accordingly the tilt angle between beam axes 113 and 115 is kept small enough to minimize geometric distortion but large enough so that optical components of the respective optical channels 140, 150 do not physically conflict with one another.

In some embodiments, left optical channel 140 uses single or multiple light-emitting diodes (LEDs) 162 as light sources, and their emissions are mixed and concentrated within a mixing light cone 166 to produce an approximate point light source 172. Light cones are familiar in the art for collecting and concentrating light, and can be fabricated readily by methods including machining, molding, casting, and electroforming.

Light from point light source 172 is collected and collimated by a collimating lens 176 to produce substantially collimated independent beam 112. Independent beam 112 is obliquely incident on substantially planar display device 110, e.g. a miniature liquid-crystal display. Imaging element 126 in left optical channel 140 projects intermediate image 132 of display surface 108 at intermediate image plane 122, where field lens 152 directs the optical energy in left optical channel 140 to fill left eyepiece aperture 142 uniformly. Left eyepiece lens 136 forms a virtual image (not shown) of intermediate image plane 122 for comfortable viewing.

In some embodiments, imaging element 126 incorporates toroidal correction to compensate for geometric distortion arising from the off-axis imaging of display surface 108.

FIG. 1 also shows an aperture stop 182 inserted in at a plane of minimum convergence 186 of independent beam 112 between imaging element 126 and intermediate image plane 122. As is familiar in the art, aperture stop 182 functions primarily to optimize contrast by blocking glare from stray and scattered light. If independent beam 112 is sufficiently collimated where it intersects display surface 108, then plane of minimum convergence 186 becomes an approximate Fourier transform plane (hereinafter the transform plane). Since independent beam 112 is incoherent, the transform plane is an approximate power Fourier transform plane and not an amplitude Fourier transform plane, which exists only in systems having coherent light. The detail in the display structure and image diffracts light at a small angle away from beam axis 113, and consequently this diffracted light propagates through the transform plane displaced slightly off-axis relative to nondiffracted light, which propagates substantially along beam axis 113. As is familiar in the art, the off-axis displacement of the diffracted light at the transform plane is proportional to the spatial frequency in the scattering display structure or image. Aperture stop 182 is appropriately sized to transmit spatial frequencies corresponding with the desired image resolution (for example VGA), while blending finer detail due to the display device's sub-pixel structure by blocking higher-order spatial frequency harmonics (e.g. light displaced farther off-axis at the transform plane), thereby reducing "graininess" and improving image quality.

Likewise in some embodiments, right optical channel 150 uses single or multiple light-emitting diodes (LEDs) 164 as light sources, and their emissions are mixed and concentrated within a mixing light cone 168 to produce an approximate point light source 174. Light from point light source 174 is collected and collimated by a collimating lens 178 to produce substantially collimated independent beam 114. Independent beam 114 is obliquely incident on substantially planar display device 110. Imaging element 128 in right optical channel 150 projects intermediate image 134 of display surface 108 at intermediate image plane 124, where a field lens 154 directs the optical energy in right optical channel 150 to fill right eyepiece aperture 144 uniformly. Right eyepiece lens 138 forms a virtual image (not shown) of intermediate image plane 124 for comfortable viewing.

In some embodiments, imaging element 128 incorporates toroidal correction to compensate for geometric distortion arising from the off-axis imaging of display surface 108.

In some embodiments, FIG. 1 also shows an aperture stop 184 inserted at the plane of minimum convergence 188 of independent beam 114 propagating toward intermediate image plane 124. As described above in relation to aperture stop 182, aperture stop 184 functions primarily to optimize contrast by blocking glare from stray and scattered light. If independent beam 114 is sufficiently collimated where it intersects display surface 108, then plane of minimum convergence 188 is also a transform plane. As described above in relation to aperture stop 182, aperture stop 184 is appropriately sized to transmit spatial frequencies corresponding with the desired image resolution, while blending finer detail due to the display device's structure by blocking higher-order spatial frequency harmonics, thereby reducing "graininess" and thus improving image quality.

Miniature display devices are available in both monochrome and color versions and in either transmissive or reflective configurations. Suppliers of transmissive microdisplays include Sony Semiconductor of San Jose, Calif.; and the Sharp, Canon, Seiko, Epson, and Kopin companies of Japan. Suppliers of reflective microdisplays include CRL of Dawley Road, Hayes, Middlesex, UK; CMD of Boulder, Colo.; Displaytech, Inc. of Longmont, Colo.; and Varitronix Limited of Hong Kong. A reflective micromirror display device is produced by Texas Instruments of Dallas, Tex.

Color display devices are generally supplied with microdot or microstrip color filters, requiring at least three pixels (red, green, and blue) to create a single color display element. As will be apparent to one skilled in the art, this compromises resolution and sacrifices optical efficiency. For display devices that are capable of sub-frame rate switching speeds, another option is to apply to each pixel sequential color techniques such as those used in early television with color wheels or, more recently, electro-optic switchable filters.

In some embodiments of the invention, light-emitting diodes 162 of left optical channel 140 comprise a group of red, green and blue color LEDs, for example 162r, 162g, 162b. LEDs 162r-g-b illuminate the input aperture to mixing light cone 166. Likewise light-emitting diodes 164 of right optical channel 150 comprise a group of red, green and blue color LEDs, for example 164r, 164g, 164b, which illuminate the input aperture to mixing light cone 168. LEDs 162r-g-b, 164r-g-b are sequentially switched for color in any manner that is compatible with an appropriately fast display device 110. For example, red LEDs 162r, 164r are switched on and all other LEDs are switched off synchronously, while a red frame video signal is applied to display device 110. For long-term stability of LED output powers and associated display color balance, electro-optic detectors 192, 194 are positioned to sample the optical outputs within appropriate color bands in respective left and right optical channels 140, 150 and appropriately adjust the drive currents with closed-loop electronic feedback.

In some embodiments the outputs from LEDs 162, 164 are captured by diffractive collectors 170, 171 and are mixed and homogenized in mixing light cones 166, 168, as described in detail below. Diffractive collectors 170, 171 are configured to diffract and superimpose the respective color components from LEDs 162r-g-b within mixing light cones 166, 168.

Some biocular vision systems and computer applications require true stereographic display viewing. A well established technique uses time-domain multiplexing of alternating right and left video signals with synchronous right-eye and left-eye electro-optic shutters (see for example Meyerhofer et al. U.S. Pat. No. 5,619,373; also Tektronix, Inc., Beaverton, Org., SGS 430 System bulletin). Similar products are offered by VRex (Elmsford, N.Y.), 3DTV Corporation (for example Model DMM StereoPlate), Kasan Model 3DMax™, PCVR™, and Stereospace Model 1™.

In some embodiments of the invention, true stereographic viewing is provided by alternate sequencing of the right and left groups of LEDs 162, 164, synchronously with time-domain multiplexing of alternate right and left video signals. Unlike previous systems that combine time-domain multiplexing of alternating right and left video signals with a common illumination source for both right-eye and left-eye optical channels (see Meyerhofer et al. U.S. Pat. No. 5,619, 373), the present embodiment provides for alternate sequencing of separate right and left groups of LEDs 162, 164 for separate optical channels 140, 150 respectively. Off-axis biocular system 100 provides unique true stereographic viewing capability with a single display device 110, because left and right optical channels 140 and 150 remain optically independent of one another from illumination sources 162, 164 to the observer's eyes 146, 148, except for sharing common display device 110. In some embodiments stereographic video sequencing is performed concurrently with the above-described sequential color switching at a sequencing rate and in a combination that minimizes visual flicker.

In some embodiments, eyepiece lenses 136, 138 comprise reflective and/or refractive lens elements. For a compact optical geometry facilitating a wide angular field of view, refractive eyepiece lenses are preferable. In some embodiments, eyepiece lenses 136, 138 are color-corrected (achromatic) to enhance color and image fidelity. Eyepiece lenses 136, 138 have eye relief ranging from approximately 0.5 inch to 0.7 inch and angular aperture ranging from approximately 20 degrees to 40 degrees full angle. In some embodiments eyepiece lenses 136, 138 are further refined by using surfaces with higher order curvatures (aspheric surfaces) to minimize aberrations. Such lenses tend to be quite thick and heavy, generally require multiple elements for achromatic performance, and are difficult and expensive to fabricate. Conventional plastic injection-molded lenses can utilize the opposite color dispersions of refractive and diffractive surfaces to create simpler, lighter, and less expensive achromats, but the appropriate lenses are typically delicate and tend to scatter light.

Figure 2G:
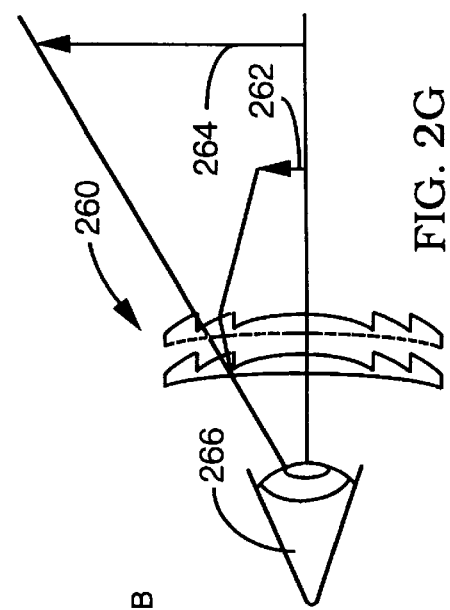
FIGS. 2A–2G are schematic views of thin color-corrected lens elements, illustratively for use in a biocular display system, in accordance with the invention.
Figure 2F:
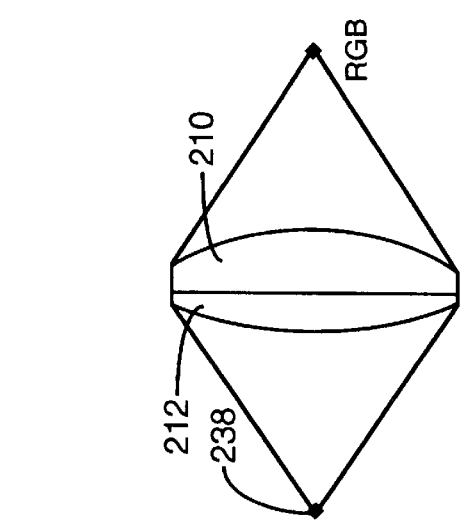
Figure 2E:
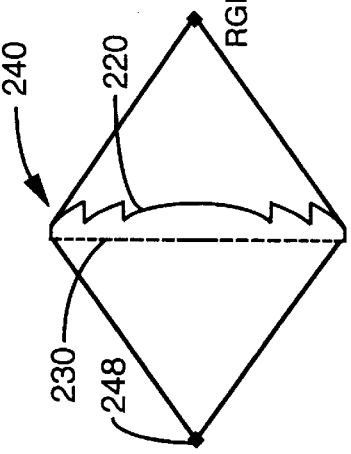
Figure 2D:
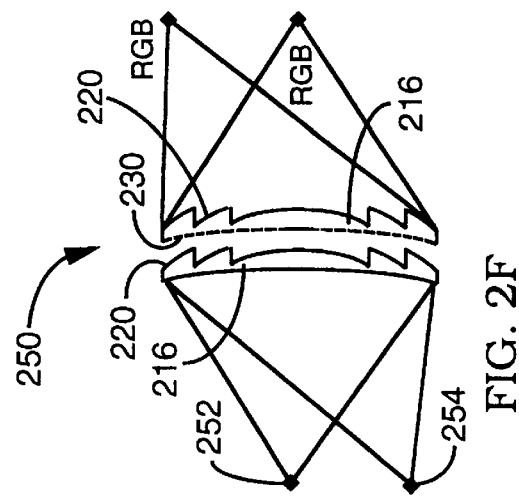
Figure 2A:
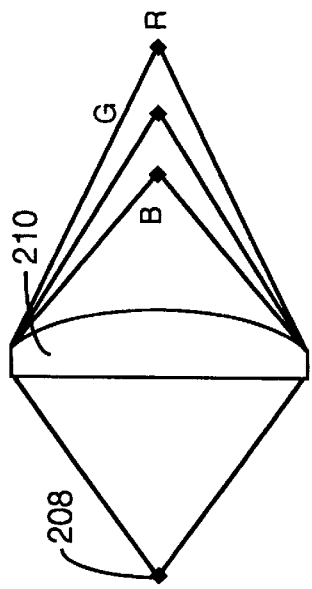
Figure 2B:
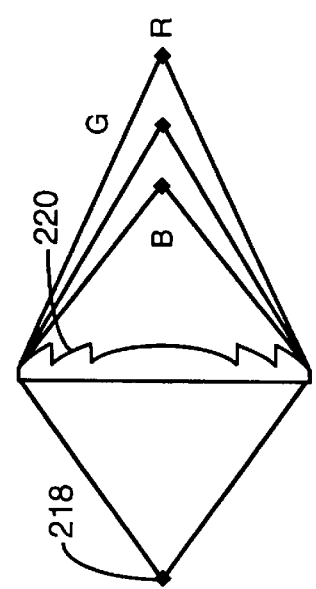
Figure 2C:
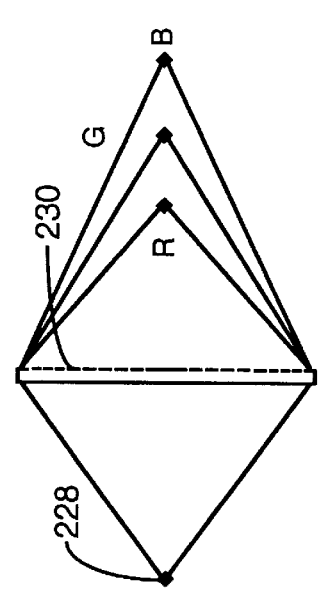

FIGS. 2A–2G are schematic views of thin color-corrected lens elements, illustratively for use in biocular display system 100, in some embodiments of the invention. FIG. 2A shows a conventional singlet refractive lens 210, having significant color distortion. Illustratively red, green, and blue color images of point object 208 are focused in sequence at points labeled R, G, and B respectively (exaggerated for clarity). FIG. 2B shows a continuously-profiled Fresnelled refractive surface 220, having reduced weight and thickness relative to conventional refractive lens 210, but also having color distortion such that the red, green, and blue color images of point object 218 are focused at points labeled R, G, and B respectively, in the same sequence as for conventional refractive lens 210. FIG. 2C shows a diffractive surface 230 used as a lens. Diffractive surface 230 is compact and light-weight, and also has color distortion, but in a reverse sequence relative to that for lens 210 and Fresnelled refractive surface 220, as illustrated by red, green, and blue color image points of point object 228 labeled R, G, and B respectively. As is familiar in the art, two conventional refractive lenses 210 and 212 having different curvatures and materials can be combined for color correction, as illustrated by the superposition of color image points of point object 238 labeled R, G, B in FIG. 2D.

In some embodiments, as is familiar in the art, diffractive structures are superimposed on Fresnelled refractive surfaces for greater design versatility. Illustratively, FIG. 2E shows diffractive-refractive lens 240 combining diffractive surface 230 with Fresnelled refractive surface 220. In addition to collapsing the thickness of the lens elements, thereby decreasing their weight and improving their moldability, diffractive-refractive lens 240 applies the offsetting color distortion sequences of diffractive surface 230 and Fresnelled refractive surface 220 to achieve color correction, as illustrated by the superposition of color image points of point object 248 labeled R, G, B in FIG. 2E.

In some embodiments, multiple thin optical elements are used for each eyepiece with any combination of smooth, refractive, and diffractive surfaces for improved control of optical aberrations. In some embodiments (not shown), the outer surface (eye side) is preferably smooth for improved cleanability. The more delicate diffractive surfaces are thereby protected as intermediate surfaces. In some embodiments, Fresnelled refractive surfaces 220 and/or diffractive surfaces 230 are applied to complex substrate curvatures 216 for greater design versatility, as illustrated by a complex refractive-diffractive lens 250 in FIG. 2F. Illustratively complex refractive-diffractive lens 250 corrects chromatic distortion (superposition of color image points labeled R, G, B) for both an on-axis point object 252 and an off-axis point object 254.

FIG. 2G is a schematic view of a complex refractive-diffractive eyepiece lens 260, incorporating chromatic and geometric correction. Eyepiece lens 260 is placed less than one focal length away from an object 262, and creates a virtual image 264 of object 262 at a distance greater than one focal length from eyepiece lens 260, as viewed through eyepiece lens 260 by an observer 266. Virtual image 264 retains chromatic and geometric fidelity. Object 262 can be a physical object or a projected intermediate real image.

As described above, color correction of an eyepiece lens can require a superposition of multiple refractive and diffractive surfaces applied to complex substrate curvatures. This in turn increases manufacturing costs. In some embodiments, a simpler and less expensive system approach is employed, in which selected optical elements in the system are color overcorrected, whereas other optical elements are uncorrected or minimally corrected for color. Using such a system approach, overall system performance is made achromatic by balancing offsetting color distortions of individual optical elements.

Illustratively, a diffractive lens surface 230 (see for example FIG. 2C) is applied to imaging elements 126 and 128 (see FIG. 1) either alone or in combination with other optical structures (e.g. toroidal correction). This results in color overcorrection, i.e. red, green, and blue color image points labeled R, G, B of point object 228 occur in the sequence shown in FIG. 2C. If imaging elements 126, 128 are appropriately color overcorrected, then field lenses 152, 154 and eyepiece lenses 136, 138 need not be individually achromatic for overall off-axis biocular system 100 to be achromatic. As needed, field lenses 152, 154 and/or eyepiece lenses 136, 138 are minimally color corrected.

It is also advantageous to have chromatic correction at planes of minimum convergence 186, 188, which are images of point sources 172, 174 respectively. To filter the fine sub-image structure requires a small diameter aperture stop 182, 184 at planes of minimum convergence 186, 188.

Chromatic distortion separates the planes of minimum convergence for different colors, e.g. R, G, B, and thereby causes a loss of image resolution accompanying the sub-image structure filtering. Chromatic correction keeps the planes of minimum convergence 186, 188 in register for all colors. Therefore minimal sacrifice of image resolution accompanies sub-image structure filtering.

In some embodiments, the optical elements between point sources 172, 174 and their images in planes of minimum convergence 186, 188, namely collimating lenses 176, 178 and imaging elements 126, 128, are individually non-corrected but are overall corrected chromatically. In particular, collimating lenses 176, 178 are color undercorrected and imaging elements 126, 128 are color overcorrected so that the net result is chromatic correction at planes of minimum convergence 186, 188. In some embodiments this is combined with color undercorrection of eyepiece lens 136, 138. Since display surface 108 lies in a collimated beam, collimating lens 176, 178 has no effect on image color fidelity at eyepiece lens 136, 138. Therefore the designer is free to use color overcorrection of imaging elements 126, 128 to compensate for color undercorrection of eyepiece lens 136, 138, as described above.

Plastic lenses are commonly injection molded from a variety of optically transparent materials, including acrylic, polycarbonate, styrene, and nylon. As will be recognized by those skilled in the art, optical design and fabrication methods described in the above embodiments for particular optical elements are illustrative and are applicable to other optical elements in the system, as required for a particular configuration. Detailed selection of locations and properties of optical elements, e.g. focal lengths and aperture diameters, is performed in accordance with techniques familiar in the art.

FIGS. 3A–3D are cross-sectional views of a folded optical path, reflective display biocular system 300, in accordance with the invention. This embodiment allows a more compact folded optical configuration, for example for use in a head-mounted display, than does the unfolded biocular off-axis system 100 shown in FIG. 1. Except for the folded optical paths, reflective display biocular system 300 performs substantially the same functions as unfolded biocular off-axis system 100, and each system contains elements that are essentially functional counterparts of elements of the other system. Some elements that are transmissive in biocular off-axis system 100 are reflective in reflective display biocular system 300. Elements that are substantially similar in the various figures are designated by similar reference numbers.

FIG. 3A is a top cutaway projection showing a left eyepiece assembly 280 and a molded optical assembly 290. A right eyepiece assembly, symmetric with left eyepiece assembly 280, is not shown for clarity. Left eyepiece assembly comprises a field lens 352 located at or proximate to an intermediate image plane 122, a deflecting mirror 282, and an eyepiece lens 336. In some embodiments eyepiece lens 336 consists of a single refractive or refractive-diffractive optical element. In other embodiments eyepiece lens 336 comprises multiple refractive, Fresnelled refractive, and/or refractive-diffractive surfaces applied to planar or curved substrates, as described above in connection with FIGS. 2A–2G. Molded optical assembly 290 and left eyepiece assembly 280 are separated by half an interocular distance 284 that is adjustable by an interocular adjustment mechanism (not shown), coupled to molded optical assembly 290 and left eyepiece assembly 280. Similarly field lens 352 is separated from deflecting mirror 282 by a focus adjustment distance 286, adjustable by a focus adjustment mechanism (not shown) coupled to field lens 352 and deflecting mirror 282.

Figure 3D:
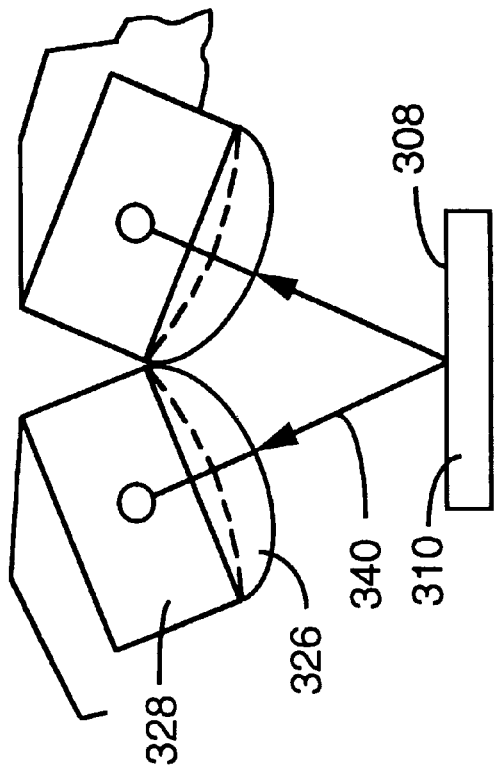
Figure 3C:
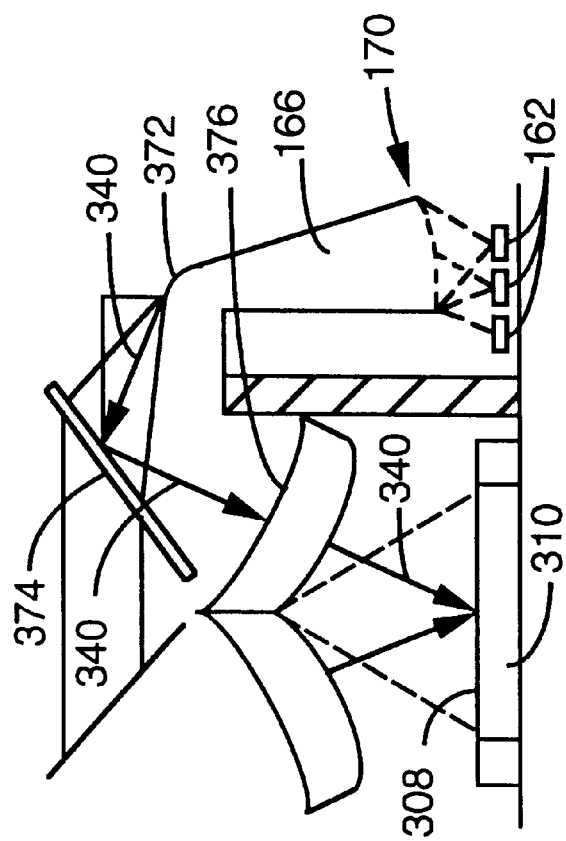

FIG. 3B is a cross-sectional view showing molded optical assembly 290 as viewed across section 3B—3B of FIG. 3A. FIG. 3C is a cross-sectional view of molded optical assembly 290 showing an illumination path as viewed across section 3C—3C of FIG. 3A, and FIG. 3D is a cross-sectional view of molded optical assembly 290 showing an imaging path as viewed across section 3D—3D of FIG. 3A. Molded optical assembly 290 mounts on a substrate 292 by means of spacers 294. In some embodiments substrate 292 is a printed circuit board. Substrate 292 also supports light sources, preferably LEDs 162, 164, and a reflective display device 310 in a nominally planar relationship. In some embodiments LEDs 162 comprise red, green, and blue color LEDs 162r-g-b and 164r-g-b respectively (see FIG. 1).

Molded optical assembly 290 includes total internally reflective (TIR) surfaces 372 and 374, collimating lens 376, imaging elements 326 and 328, and TIR stop 382. Molded optical assembly 290 further includes mixing light cones 166, 168, equipped with diffractive collectors 170, 171 respectively adjacent LEDs 162, 164.

In some embodiments molded optical assembly 290 is fabricated in whole or in part as a monolithic, unitary structure with self-contained optical components, as described in Hebert U.S. Pat. No. 5,596,454, issued Jan. 21, 1997. Integrally molded mechanical features allow for precise registration of the optical elements of molded optical assembly 290 relative to one another and relative to substrate 292 and thereby relative to LEDs 162, 164 and reflective display device 310 mounted on substrate 292. In other embodiments molded optical assembly 290 is fabricated as a frame onto which individual optical elements are assembled.

In operation, a video signal is applied to reflective display device 310, thereby producing a reflective video image on reflective display surface 308. In some embodiments the video signal comes from a remote video camera (not shown). In some embodiments a computer graphic generator synthesizes the video signal. In some embodiments the video signal is supplied from data previously stored on disk, tape, or other storage medium. Acquisition and processing of the video signal is described below in greater detail.

Reflective display surface 308 is illuminated by light beams defining independent left optical channel 340 and right optical channel 350 respectively. Arrows labeled 340 in FIGS. 3A–3D represent the beam propagation path of left optical channel 340. The beam propagation path of right optical channel 350 is symmetric with that of left optical channel 340, but is not labeled for clarity. Each optical element of right optical channel 350 is a symmetric counterpart and performs a function identical to that of a corresponding optical element of left optical channel 340. Beam propagation paths are laid out so that left optical channel 340 and right optical channel 350 intersect only at reflective display surface 308, ensuring that optical elements of respective left and right optical channels 340 and 350 do not interfere physically with one another. As described above in connection with FIG. 1, image distortion is produced in left and right optical channels 340, 350 respectively, because of off-axis illumination of reflective display surface 308.

Referring to FIG. 3C, illumination for left optical channel 340 is generated by LEDs 162. In some embodiments LEDs 162 comprise color LEDs 162r-g-b, whereas in other embodiments the illumination is monochrome. The outputs from LEDs 162 are captured by diffractive collector 170 and are mixed and homogenized in mixing light cone 166.

Diffractive collector 170 is configured to deflect and superimpose the respective color components from LEDs 162r-g-b within mixing light cone 166. Illustratively each differing color component from LED 162r, 162g,162b respectively impinges on diffractive collector 170 at a differing angle of incidence. Diffractive collector 170 is configured so that the respective color components are diffracted at differing angles, such that the diffracted color components are all substantially superimposed and propagate together within mixing light cone 166, as if these color components were all emitted from a spatially common light source. This application of diffractive collector 170 is essentially the inverse of typical diffractive surfaces, wherein a single light beam comprising differing color components is diffracted into a plurality of separate light beams each having differing angles for differing color components.

Beam 340 emerges from mixing light cone 166 substantially as a point source of light, which is deflected by TIR reflective aperture 372. After being collected and reflected by a TIR folding surface 374, beam 340 passes through collimating lens 376, producing a substantially parallel beam 340 that reflects obliquely from reflective display surface 308 (see diagonal arrow 340 in FIG. 3A). At reflective display surface 308, beam 340 is spatially modulated by a video image. In some embodiments color LEDs 162r-g-b are sequenced synchronously with a color video signal to reflective display device 310, thereby producing a sequentially color modulated reflected beam, as described above in connection with FIG. 1.

Referring to FIG. 3D, after modulation and reflection from reflective display surface 308, beam 340 propagates to imaging elements 326 and 328, which collectively perform functions analogous to those of imaging elements 126, 128 as described above in connection with FIG. 1. In the present embodiment, imaging element 326 is a transmissive element that combines refractive, Fresnelled refractive, and/or diffractive properties. Imaging element 328 is a TIR reflective element disposed to fold beam 340 toward TIR stop 382, which then deflects beam 340 toward intermediate image plane 122 (see FIGS. 3A–3B). In some embodiments, imaging element 328 incorporates curvature, which combined with transmissive imaging element 326, focuses beam 340 through a plane of minimum convergence at TIR stop 382 and then to form an intermediate image of reflective display surface 308 at intermediate image plane 122. In some embodiments imaging element 326 and/or 328 incorporates toroidal correction to compensate for image distortion arising from off-axis imaging of display surface 308.

TIR stop 382 combines the function of folding beam 340 toward left eyepiece assembly 280 with an aperture stop function, similar to aperture stops 182, 184 described above in connection with FIG. 1. TIR stop 382 comprises a small TIR element that reflects the central portion of beam 340 at substantially a right angle toward left eyepiece assembly 280, while letting undesired diffracted and scattered light pass harmlessly around it.

Molded optical assembly 290 advantageously uses TIR surfaces to reflect beam 340 efficiently without the need for expensive optical coatings. This design approach facilitates unitary fabrication of molded optical assembly 290.

After reflecting from TIR stop 382, beam 340 propagates to intermediate image plane 122, where it forms an intermediate image 132 of reflective display surface 308. The properties of intermediate image 132 of the present embodiment are substantially identical with those of intermediate image 132 described above in connection with FIG. 1. As in the embodiment of FIG. 1, field lens 352 is placed at intermediate image plane 122, in order to fill the aperture of eyepiece lens 336 with optical energy. For compactness a deflecting mirror 282 to fold beam 340 is inserted between intermediate image plane 122 and eyepiece lens 336.

The full range of optical element configurations, as described above, is applicable to reflective display biocular system 300. These configurations include transmissive and reflective, off-axis, toroidal, refractive, diffractive, and Fresnelled refractive elements. In some embodiments, a system design approach to color correction, as described above in connection with FIGS. 2A–2G, is applied to reflective display biocular system 300. With such a system design approach, the overall system performance is made achromatic by balancing the offsetting color distortions of individual optical elements.

Illustratively, a diffractive lens surface 230 (see for example FIG. 2C) is applied to imaging element 326 (see FIG. 3D) either alone or in combination with other optical structures (e.g. toroidal correction). This results in color overcorrection, i.e. red, green, and blue color image points labeled R, G, B of point object 228 occur in the sequence shown in FIG. 2C. If imaging element 326 is appropriately color overcorrected, then field lens 352 and eyepiece lens 336 need not be individually achromatic for overall reflective display biocular system 300 to be achromatic. As needed, field lens 352 and/or eyepiece lens 336 is minimally color corrected.

As described above, it is also advantageous to have chromatic correction at the plane of minimum convergence substantially coincident with TIR stop 382, at which an image of TIR reflective aperture 372 is formed. Chromatic correction keeps the plane of minimum convergence in register for all colors, minimizing loss of image resolution with sub-image structure filtering.

In some embodiments, the optical elements between TIR reflective aperture 372 and its image at TIR stop 382, namely collimating lens 376 and imaging elements 326, 328, are individually non-corrected but are collectively corrected chromatically. For example, collimating lens 376 is color undercorrected, but imaging element 326 is color overcorrected, so that the net result is chromatic correction at TIR stop 382. In some embodiments, this is combined with color undercorrection of eyepiece lens 336. Since reflective display surface 308 lies in a collimated region of beam 340, collimating lens 376 has no effect on image color fidelity at eyepiece lens 336. Therefore a system designer is free to use color overcorrection of imaging element 326 to offset color undercorrection of eyepiece lens 336, as described above.

In some embodiments, true stereographic viewing is provided by alternate sequencing of the right and left groups of LEDs 162, 164, synchronously with time-domain multiplexing of alternating right and left video signals, as described above in connection with FIG. 1. Reflective display biocular system 300 provides unique true stereographic viewing capability with a single reflective display device 310, because left and right optical channels 340 and 350 remain optically independent of one another, except for sharing common reflective display device 310. In some embodiments, stereographic video sequencing is performed concurrently with the above-described sequential color switching at a sequencing rate and in a combination that minimizes visual flicker.

Figure 4A:
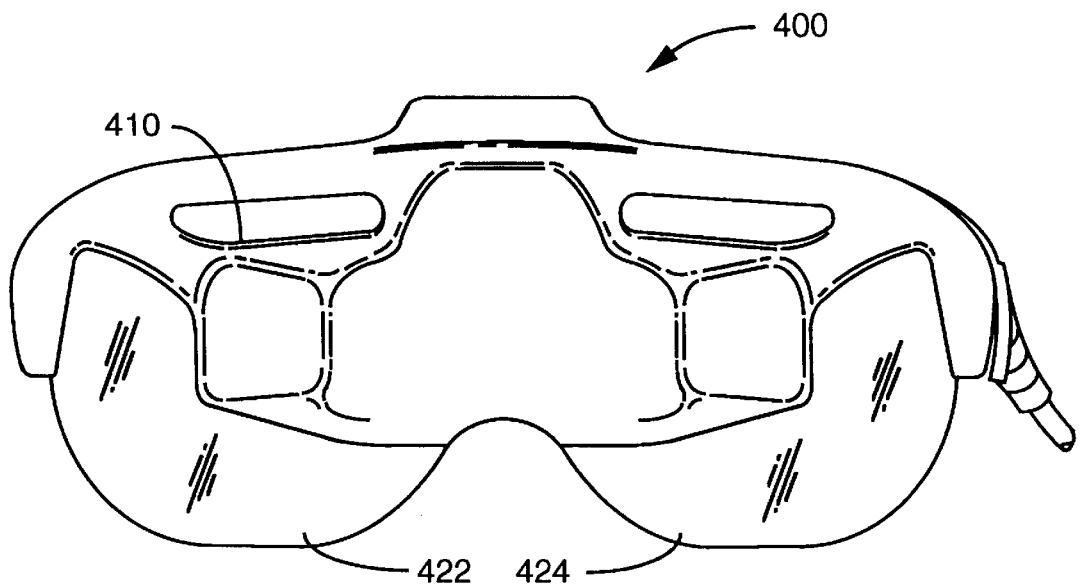
FIGS. 4A and 4B are elevational views of a biocular display viewing system folded into a head-mounted display (HMD) housing, in accordance with the invention.

FIG. 4A is a front elevational view of a biocular display viewing system 400 incorporating a head-mounted display (HMD) housing 410 containing, for example, an off-axis biocular system 100 or a reflective display biocular system 300 and incorporating interchangeable corrective peripheral vision lens elements 422, 424, in accordance with the invention.

Figure 4B:
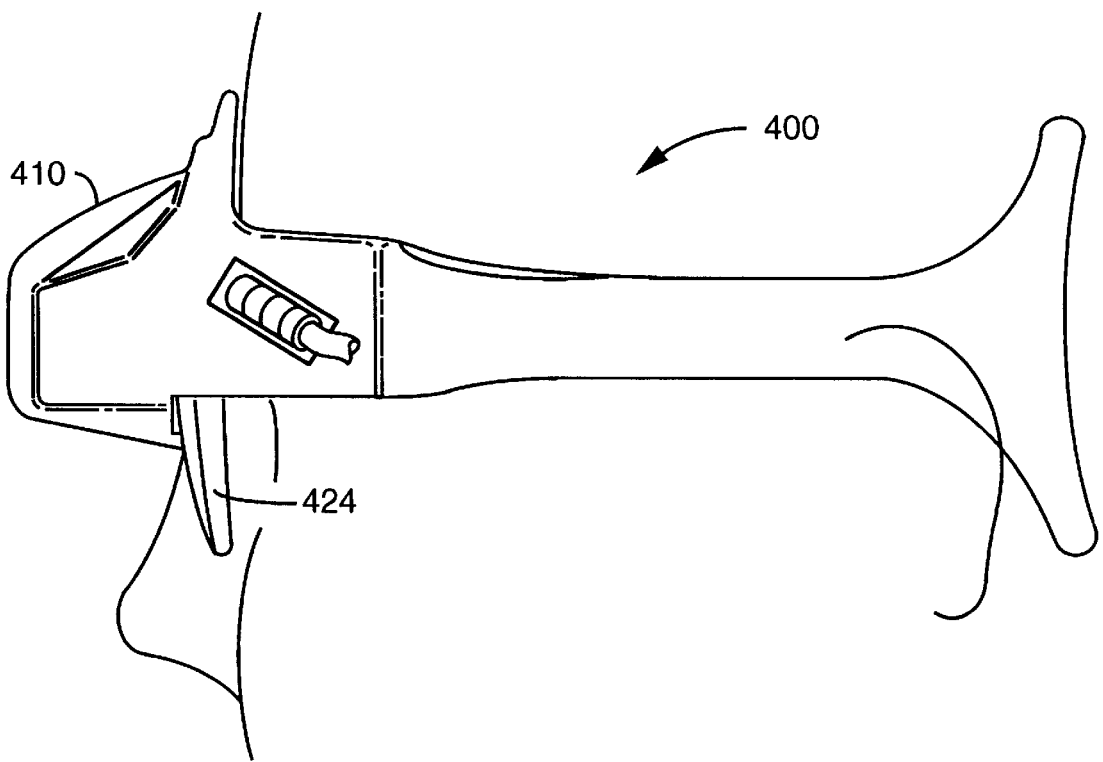

FIG. 4B is a side elevational view of the biocular display viewing system of FIG. 4A. For users requiring corrected vision, an appropriate HMD device must either provide eye relief space to accommodate eyeglasses, or provide eyepiece-focusing adjustments. Accommodating eyeglasses compromises the ergonomic mechanical design of the device in that the eye relief must be extended beyond the surface of the eyeglasses. Thus, the device becomes bulkier, heavier and generally less comfortable.

In some embodiments of the invention, biocular display viewing system 400 provides eyepiece-focusing adjustments (not shown). However, true peripheral vision correction is required for a typical user environment. In some embodiments, interchangeable corrective peripheral vision lens elements 422, 424 are integrated into a HMD housing, as illustrated in FIGS. 4A–4B. As with over-the-counter conventional corrective eyewear, a few general optical prescriptions potentially satisfy a range of peripheral vision requirements; generally in the range of −0.5 to +1.5 diopter. This is especially true for a limited-distance peripheral vision requirement, as in a computer workplace environment. Illustratively, interchangeable corrective peripheral vision lenses 422, 424 are made of injection-molded plastic with integrally molded snap features (not shown), which permit easy, interchangeable installation onto a compatibly designed HMD housing 410. Alternatively, commercially available eyeglass lens blanks may be milled and shaped to fit the HMD.

While many configurations are possible for corrective peripheral vision lens elements 422, 424, a wrap-around configuration as illustrated in FIG. 4A is generally preferred for optimum peripheral vision, wherein corrective peripheral vision lens elements 422, 424 include cutout segments to surround respective left and right eyepiece lenses 336, 337.

Figure 4C:
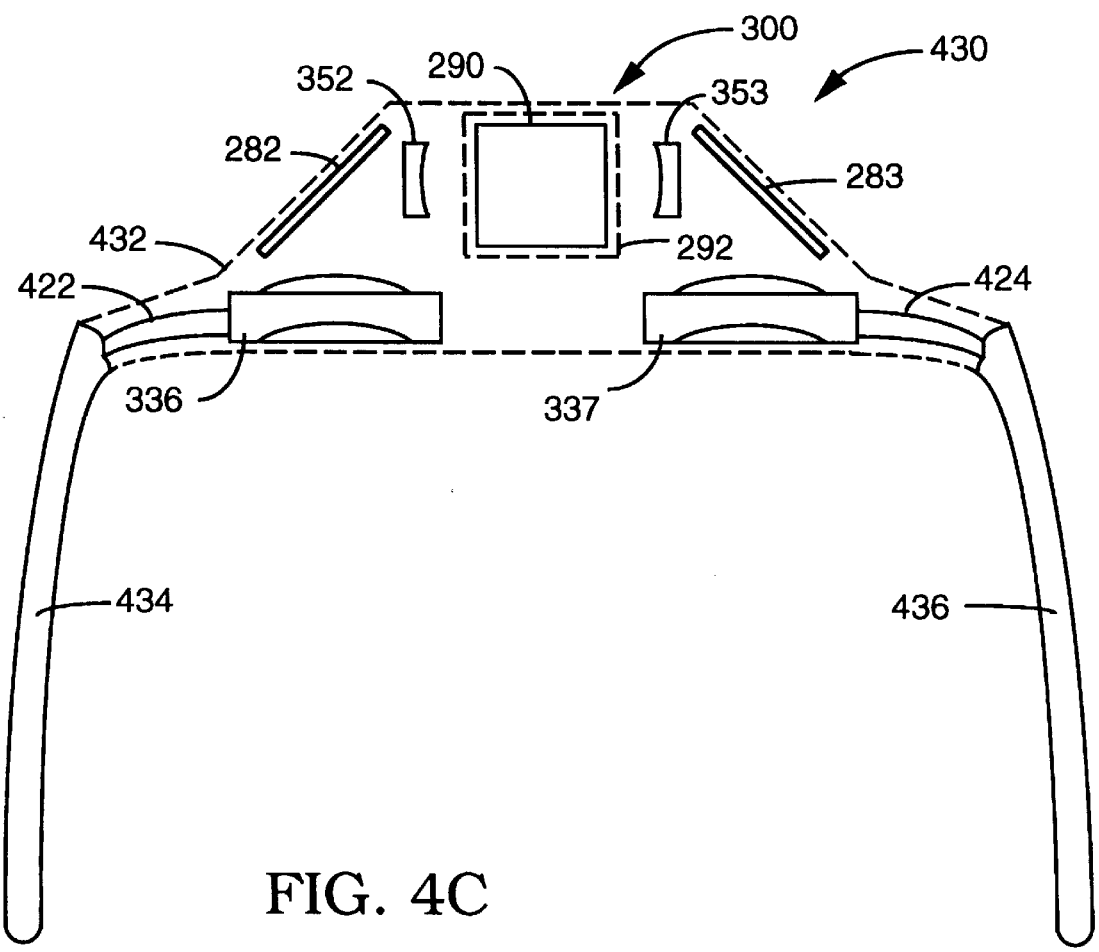
FIG. 4C is a top view illustrating schematically a biocular display viewing system installed into a head-mounted display (HMD) housing.

FIG. 4C is a top view illustrating schematically how a biocular display viewing system 430 similar to that described in connection with FIGS. 3A–3D fits into a head-mounted display (HMD) housing. HMD housing 432 (shown in shaded outline in FIG. 4C) with earpieces 434, 436 and corrective peripheral vision lens elements 422, 424 contains a reflective display biocular system 300, incorporating molded optical assembly 290, as viewed in FIG. 3A. Molded optical assembly 290 incorporates a substrate 292 (preferably a printed circuit board) to which a reflective display device and LED light sources (hidden beneath molded optical assembly 290 are attached. Left and right imaging beams emerge from molded optical assembly 290 and are directed to left and right eyes respectively by left field lens 352, left deflecting mirror 282, and left eyepiece lens 336, and by right field lens 353, right deflecting mirror 283, and right eyepiece lens 337.

Figure 4D:
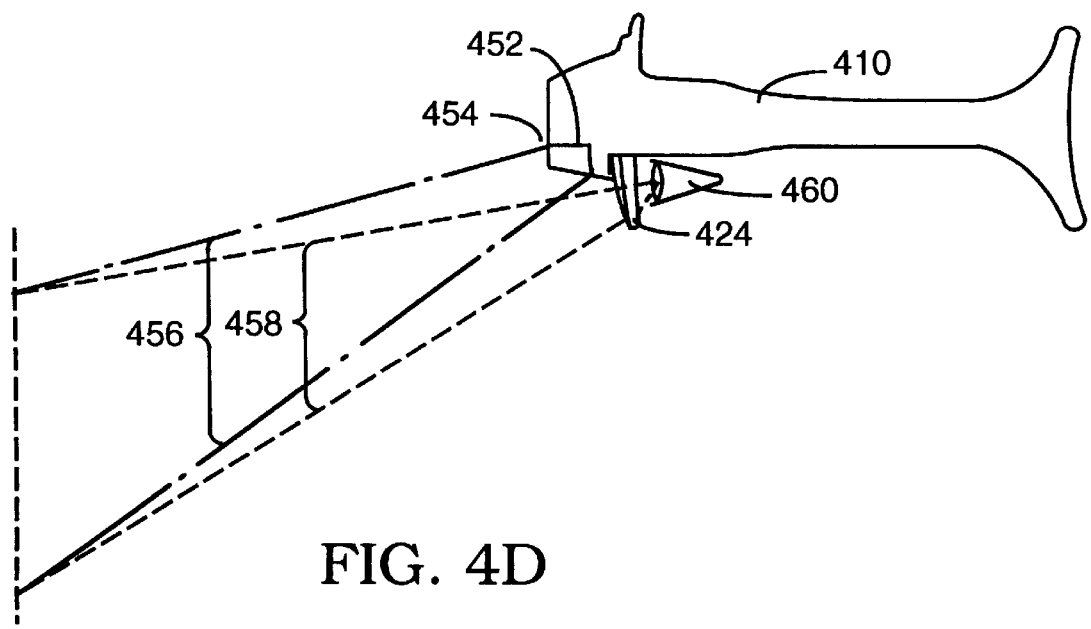
FIG. 4D is an elevational view illustrating a photodetector mounted with an input lens on a HMD housing.

Some embodiments include a photodetector with a lens to measure ambient light intensity and to enable automatic adjustment of the display intensity for improved visualization. FIG. 4D is an elevational view illustrating a photodetector 452 mounted with an input lens 454 on HMD housing 410. Photodetector 452 is disposed to have an ambient field of view 456 through input lens 454 that approximates the peripheral field of view 458 of observer 460. In some embodiments equipped with corrective peripheral vision lens elements 424 and 422 (see FIG. 4A), peripheral field of view 458 of observer 460 is taken through corrective peripheral vision lens elements 424 and 422.

Figure 5:
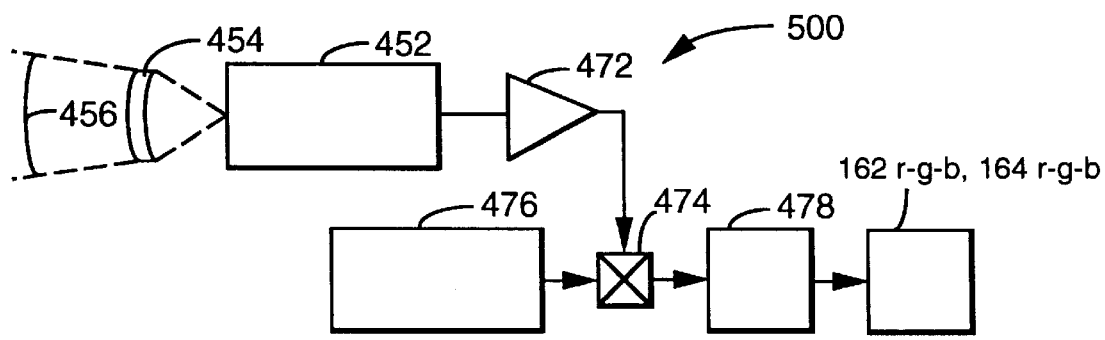
FIG. 5 is a simplified schematic block diagram of a circuit interconnecting a photodetector with display light sources.

FIG. 5 is a simplified schematic block diagram of a circuit 500 interconnecting photodetector 452 with display light sources (for example LEDs 162r-g-b, 164r-g-b, see FIG. 1). Photodetector 452 is positioned behind input lens 454 and has an output terminal connected to an input terminal of an amplifier 472. Amplifier 472 in turn has an output terminal connected to a reference input terminal of a summing junction 474. A signal input terminal of summing junction 474 is connected to the output terminal of a nominal contrast and intensity control module 476. The output terminal of summing junction 474 is connected to the input terminal of a light source driver 478, which has an output terminal connected to the light source.

In some embodiments, light source driver 478 represents a plurality of light source drivers, each driving an individual light source, for example LED 162r. In some embodiments, circuit 500 represents a plurality of individual circuits comprising individual photodetectors, amplifiers, and light source drivers. In some embodiments, circuit 500 includes input terminals (not shown) interconnected with light source sequencing apparatus. In some embodiments, all of the elements of circuit 500 are contained in or on HMD housing 410. However, other embodiments apparent to those skilled in the art, having any and all of the elements of circuit 500, including photodector 452 and input lens 454, located separately from HMD housing 410, are also within the scope of the invention.

In operation, illustratively input lens 454 collects ambient light over ambient field of view 456 and concentrates the collected ambient light on the sensing element of photodetector 452, which generates an output signal proportional to the intensity of the collected ambient light. The output signal from photodetector 452 is amplified by amplifier 472, which generates a reference signal and applies it to the reference terminal of summing junction 474. Summing junction 474 combines the reference signal with control signals provided by nominal contrast and intensity control module 476, and generates adjusted contrast and intensity control signals, which are applied to the input terminals of light source drivers 478. The adjusted contrast and intensity control signals automatically adjust the intensity of light sources, e.g. LEDs 162, 164, for a near-constant ratio to the ambient light intensity, without the need for continual manual intensity adjustment in a continually changing ambient light environment.

Figure 6A:
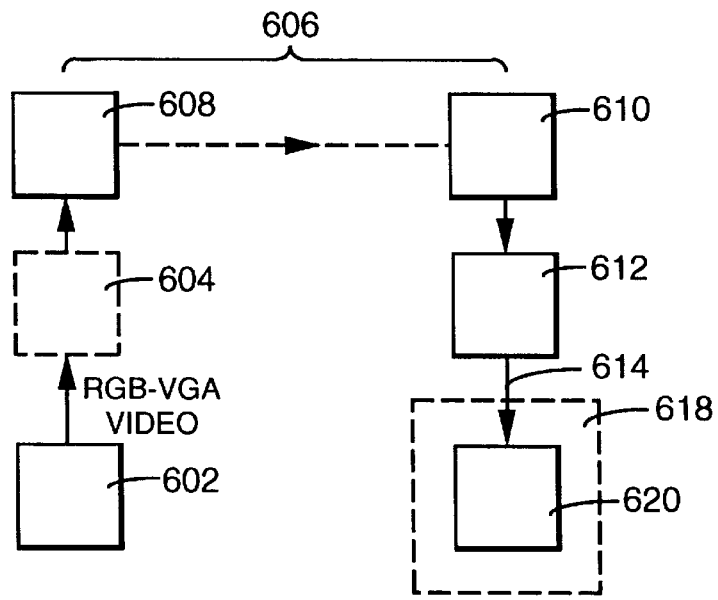
FIG. 6A is a block diagram illustrating the generation, transmission, reception, and processing of a video signal into a format suitable for a display system.

In operation, the display system requires a video input signal. The video signal is typically generated by a source device (e.g. video camera or VCR) remote from the display system, and is then transmitted, received, and processed to meet the particular requirements of the display device. FIG. 6A is a block diagram illustrating the generation, transmission, reception, and processing of a video signal into a format suitable for a display system, in an embodiment of the invention.

A source device 602 generates video signals in a conventional RG2-VGA format in the analog domain. These signals are transmitted either by cable (not shown) or by an appropriate wireless data link 606 comprising a transmitter 608 and a receiving module 610 connected with a processing module 612. Processing module 612 is physically located at or adjacent to a display device 620 as described above in connection with FIGS. 1 and 3A–3D, or located independently. Optionally a preprocessing module 604 (shown in dashed outline) is located at or adjacent to source device 602 and is interconnected between source device 602 and transmitter 608. An independently located processing module 612 is typically connected to display device 620 by a short cable 614. For example, a processing module 612 can be incorporated into an optional head-mounted display housing 618 (shown in dashed outline). Alternatively, to reduce bulk and weight of head-mounted display housing 618, processing module 612 is attached conveniently for example to a user's clothing (not shown) and connected into head-mounted display housing 618 by a short, minimally encumbering cable 614.

Processing modules 604, 612 convert video signals into a format required by display device 620. In practice, visual quality of a display requires a frame rate that minimizes the eye's perception of flicker. But the flicker frame rate requirement is about four times faster than that required to create a sense of continuous motion of an object within an image.

Unlike conventional analog CRT-based VGA monitors, many miniature display devices appropriate to the invention are not directly scan-compatible with the standard RGB interface and require an intermediate memory (frame grabber) for scan format conversion. Where intermediate memory is a requirement, the display device refreshes from the intermediate memory at a frame rate to minimize flicker, but the intermediate memory is updated only at a slower frame rate consistent with image motion requirements.

Figure 6B:
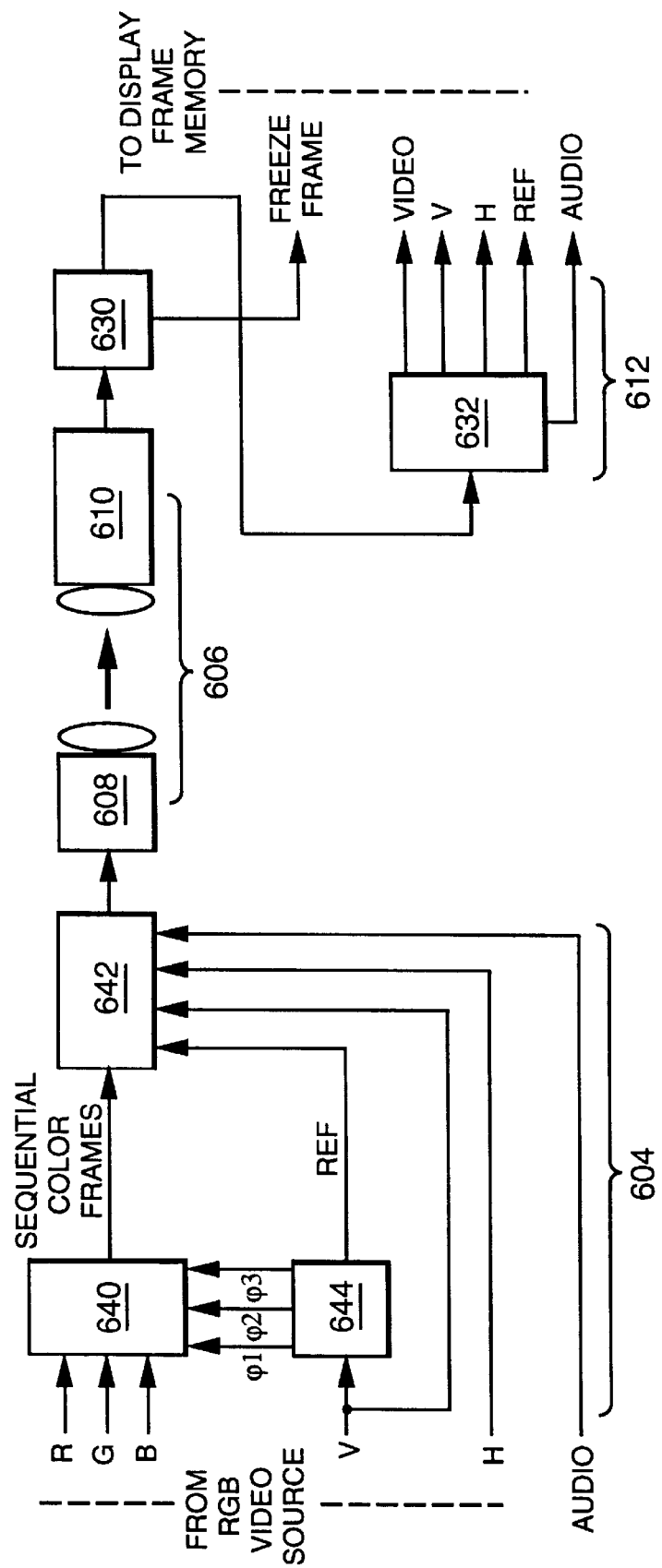
FIG. 6B is a block diagram illustrating the functions of video signal processing modules in connection with the use of intermediate frame memory with a display system.

FIG. 6B is a block diagram illustrating the functions of processing modules 604, 612 in connection with the use of intermediate frame memory with a display system, in an embodiment of the invention. Inputs from a conventional RGB video source (not shown) are received by a serial multiplexer 640 and a shift register 644 incorporated into processing module 604. The vertical sync pulse from the video source causes shift register 644 to control multiplexer 640 to generate large sequential color frames of video data. These are combined with vertical and horizontal sync pulses in a combiner module 642, optionally, audio signals are embedded into the horizontal sync pulses of the video waveform in combiner module 642.

A combined video signal from combiner module 642 is transmitted over wireless date link 606 from transmitter 608 to receiving module 610 and is applied to processor module 612. In processor module 612 the video signal is optionally amplified in conventional automatic gain control module 630 and is then separated into its respective video, sync, and audio components by sync separator 632. The various signal components are appropriately applied to the intermediate memory (not shown), which interfaces with the input electronics of display device 620.

In this case, it is sufficient to serial-multiplex large strings of analog video data of each color (frame-by-frame or interleaved line-by-line, for example) prior to transmission to reduce the required transmission data rate, eliminate tracking phase-locked loop clocks, and simplify the analog-to-digital conversion and memory requirements of processing module 612. This technique results in a slower but visually equivalent replication of a standard RGB interface.

In accordance with the invention, true stereographic viewing is achieved using a single display device with appropriate inexpensive optics and without a beamsplitter. Low-cost complex plastic optics allow biocular viewing of a single electro-optic display device, such as for use in a head-mounted display (HMD). A dual off-axis configuration provides two independent optical channels, intersecting only at the image surface of the display device. Each optical channel contains its own illumination source, eyepiece lens, and imaging optics. In some embodiments, nearly collimated illumination optics and intermediate field lenses are used to fill wide-aperture eyepieces without the need for a beamsplitter.

Multiple illumination schemes are described for either monochrome or color, and in either two-dimensional or time-sequential true stereographic presentation. In some embodiments, true stereographic performance is achieved by sequential activation of the light sources in the two channels in synchronism with sequential video signals for the respective channels. Offsetting color overcorrection and undercorrection methods are applied to minimize optical element complexity. Additional features include lightweight achromatic eyepiece construction and interchangeable lenslets for peripheral vision correction, and automatic contrast and intensity compensation. A video interface converts conventionally formatted video signals to serially multiplexed color data, which fills an intermediate frame refresh memory. Versions of the video interface include wireless transmission, eliminated cumbersome cabling.

Particularly, embodiments of the invention provide the depth perception, high resolution, high color fidelity, peripheral vision correction, and convenience of use in a head-mounted configuration to satisfy the demanding requirements of medical and surgical remote viewing.

Therefore, in accordance with the invention, a compact, high resolution, high contrast, truly stereographic system is provided for microdisplay viewing, that is suitable for head-mounted display use without requiring undue complexity or expense. The system provides color correction for good color fidelity, and incorporates ergonomic features for comfort and efficiency, including wide-angle display viewing with long eye relief, and peripheral vision accommodation. Wireless versions eliminate the need for cumbersome cabling. Particularly, high resolution, high color fidelity, truly stereographic viewing in a head-mounted display, including peripheral vision accommodation and wireless transmission, provides the depth perception and convenience required for medical and surgical remote viewing.

Although the invention has been described in terms of a certain preferred embodiment, other embodiments apparent to those skilled in the art are also within the scope of this invention. Accordingly, the scope of the invention is intended to be defined only by the claims which follow.

I claim:

1. A biocular viewing system comprising:
   a single display device having a substantially planar display surface;
   a first optical channel comprising a first light source, a first beam generated by said first light source, said first beam illuminating said display surface at an oblique angle;
   a second optical channel comprising a second light source, a second beam generated by said second light source, said second beam illuminating said display surface at an oblique angle;
   wherein said second optical channel and said first optical channel are mutually disposed such that said first beam and said second beam are angularly displaced from one another and intersect with one another at said display surface; and
   wherein said second optical channel and said first optical channel are configured substantially similarly.

2. The biocular viewing system according to claim 1, wherein said display device is an optically transmissive microdisplay.

3. The biocular viewing system according to claim 1, wherein said display device is a liquid crystal video display.

4. The biocular viewing system according to claim 1, wherein said first beam is substantially collimated where it illuminates said display surface.

5. The biocular viewing system according to claim 4, further comprising:
 a first eyepiece lens located in said first beam;
 a first imaging element located between said first light source and said first eyepiece lens; and
 a first intermediate image plane located between said first imaging element and said first eyepiece lens.

6. The biocular viewing system according to claim 5, wherein said first imaging element includes aspheric toroidal curvature.

7. The biocular viewing system according to claim 5, further comprising a field lens placed proximate to said first intermediate image plane.

8. The biocular viewing system according to claim 7, wherein said first light source comprises a substantial point source of light.

9. The biocular viewing system according to claim 8, further comprising a mixing light cone having a plurality of light emitting diodes adjacent an input aperture of said cone and having said substantial point source of light at an output aperture of said cone.

10. The biocular viewing system according to claim 9, wherein said plurality of light emitting diodes generate light of differing color.

11. The biocular viewing system according to claim 10, further comprising a diffractive collector positioned between said light emitting diodes and said input aperture of said cone.

12. The biocular viewing system according to claim 9, further comprising at least one monitoring photodetector disposed to sample and measure the light generated by said plurality of light emitting diodes.

13. The biocular viewing system according to claim 8, wherein said first light source further comprises a collimating lens inserted between said substantial point source of light and said display surface.

14. The biocular viewing system according to claim 13, wherein at least one element selected from said collimating lens, said first imaging element, said field lens, and said first eyepiece lens includes at least one diffractive surface.

15. The biocular viewing system according to claim 14, wherein said at least one element includes at least one continuous-profile Fresnelled refractive surface.

16. The biocular viewing system according to claim 14, wherein said at least one element is configured for color overcorrection.

17. The biocular viewing system according to claim 13, wherein at least one element selected from said collimating lens, said first imaging element, and said first eyepiece lens includes at least one continuous-profile Fresnelled refractive surface.

18. The biocular viewing system according to claim 17, wherein said at least one element is configured for color undercorrection.

19. The biocular viewing system according to claim 14, 17, or 15, wherein said at least one surface has approximate constant depth grooves, thereby reducing thickness and weight of said element.

20. The biocular viewing system according to claim 19, wherein variations in said thickness of said element are minimized, thereby facilitating fabrication of said element by a process of plastic molding.

21. The biocular viewing system according to claim 14, 17, or 15, wherein said at least one surface is applied to a nominally flat substrate surface.

22. The biocular viewing system according to claim 14, 17, or 15, wherein said at least one surface is applied to a nominally curved substrate surface.

23. The biocular viewing system according to claim 22, wherein said nominally curved substrate surface is aspheric.

24. The biocular viewing system according to claim 13, wherein at least one element selected from said collimating lens, said first imaging element, said field lens, and said first eyepiece lens is formed of injection-molded plastic.

25. The biocular viewing system according to claim 24, wherein said collimating lens, said first imaging element, said field lens, and said first eyepiece lens are all formed of injection-molded plastic.

26. The biocular viewing system according to claim 8, further comprising a photodetector disposed to measure the intensity of ambient light.

27. The biocular viewing system according to claim 5, further comprising an aperture stop positioned in said first beam proximate to a transform plane located between said first imaging element and said first intermediate image plane.

28. The biocular viewing system according to claim 1, further comprising at least one off-axis optical element.

29. The biocular viewing system according to claim 28, comprising at least one reflective optical element, thereby defining a folded optical configuration.

30. The biocular viewing system according to claim 29, wherein at least one said reflective surface incorporates total internal reflection.

31. The biocular viewing system according to claim 29, wherein said biocular viewing system is centrally disposed between laterally displaced peripheral vision means within a supporting structure.

32. The biocular viewing system according to claim 31, wherein said peripheral vision means comprises corrective eye lenses interchangeably attachable to said supporting structure.

33. The biocular viewing system according to claim 32, wherein said corrective eye lenses are formed of injection-molded plastic.

34. The biocular viewing system according to claim 33, wherein said corrective eye lenses are interchangeably attachable to said supporting structure by means of integrally molded snap fasteners.

35. The biocular viewing system according to claim 31, wherein said supporting structure is configured for head-mounted display viewing.

36. The biocular viewing system according to claim 31, further comprising a photodetector attached to said supporting structure and disposed to measure the intensity of ambient light over a field of view approximating the field of view of an observer through said peripheral vision means.

37. The biocular viewing system according to claim 28, wherein at least one optical element incorporates aspheric toroidal curvature.

38. The biocular viewing system according to claim 28, wherein said display device is an optically reflective microdisplay.

39. A method of producing a biocular video display, comprising:
 generating a collimated first beam of light;
 illuminating a video display device at an oblique angle with said collimated first beam of light in a first optical channel;

spatially modulating said first beam with a video image at a display surface of said display device;

propagating said first beam through said first optical channel;

forming a first image of said display surface using a first eyepiece lens in said first optical channel, said first image being comfortably viewed adjacent said first eyepiece lens by a first eye of an observer;

generating a collimated second beam of light;

illuminating said video display device at an oblique angle with said collimated second beam of light in a second optical channel;

spatially modulating said second beam with a video image at said display surface of said display device;

propagating said second beam through said second optical channel;

forming a second image of said display surface using a second eyepiece lens in said second optical channel, said second image being comfortably viewed adjacent said second eyepiece lens by a second eye of said observer;

wherein said first and second optical channels are mutually disposed such that said first beam and second beam are angularly displaced from one another and intersect with one another at said display surface; and wherein said first and second optical channels are configured substantially similarly.

40. The method according to claim 39, wherein said display device is a liquid crystal video display.

41. The method according to claim 39, wherein said display device is an optically transmissive microdisplay.

42. The method according to claim 39, further comprising:

forming a first intermediate image of said display surface at a first intermediate image plane in said first beam using a first imaging element following said display device;

directing said first beam from said first intermediate image plane to fill a first eyepiece aperture;

forming a second intermediate image of said display surface at a second intermediate image plane in said second beam using a second imaging element following said display device;

directing said second beam from said second intermediate image plane to fill a second eyepiece aperture.

43. The method according to claim 42, wherein said first imaging element applies aspheric toroidal correction to remove image distortion in said first beam due to said oblique illumination of said display surface by said first beam.

44. The method according to claim 42, wherein said directing is performed using a field lens placed proximate to said first intermediate image plane.

45. The method according to claim 44, wherein said generating further comprises:

producing light from a first light source in said first optical channel;

mixing and homogenizing said light from said first light source in said first optical channel;

forming said homogenized light from said first light source into a substantial point source of light in said first optical channel;

collecting and collimating light propagating from said substantial point source in said first optical channel;

producing light from a second light source in said second optical channel;

mixing and homogenizing said light from said second light source in said second optical channel;

forming said homogenized light from said second light source into a substantial point source of light in said second optical channel; and collecting and collimating light propagating from said substantial point source in said second optical channel.

46. The method according to claim 45, wherein:

said mixing, homogenizing, and forming of said light from said first light source are performed using a first mixing light cone in said first optical channel, wherein light produced by said first light source is collected at an input aperture and said substantial point source in said first optical channel is formed at an output aperture respectively of said first mixing light cone; and said mixing, homogenizing, and forming of said light from said second light source are performed using a second mixing light cone in said second optical channel, wherein light produced by said second light source is collected at an input aperture and said substantial point source in said second optical channel is formed at an output aperture respectively of said second mixing light cone.

47. The method according to claim 46, wherein:

said first light source comprises a plurality of first light emitting diodes in said first optical channel; and said second light source comprises a plurality of second light emitting diodes in said second optical channel.

48. The method according to claim 47, wherein:

said first light emitting diodes produce light of differing colors; and said second light emitting diodes produce light of differing colors.

49. The method according to claim 48, wherein said first and second light sources producing light of differing colors are sequentially activated in synchronism with corresponding sequential video color signals to said display device, thereby producing a time-averaged color image using a single display device.

50. The method according to claim 49, wherein said first and second light sources are sequentially activated in synchronism with corresponding sequential video signals to said display device for respective first and second optical channels, thereby producing a time-averaged true stereoscopic color image with a single display device.

51. The method according to claim 48, further comprising collecting light from said plurality of first and second light emitting diodes using diffractive collectors in first and second optical channels respectively positioned at said input apertures of said first and second mixing light cones respectively, each said diffractive collector spatially superimposing said light of differing colors within said first and second mixing light cones respectively.

52. The method according to claim 47, wherein said first and second light sources are sequentially activated in synchronism with corresponding sequential video signals to said display device for respective first and second optical channels, thereby producing a time-averaged true stereoscopic image using a single display device.

53. The method according to claim 47, further comprising controlling and stabilizing the light intensities of said first and second light emitting diodes by sampling and monitoring said intensities with at least one photodetector in first and second optical channels respectively, using a closed-loop electrical configuration.

54. The method according to claim 45, wherein the collecting and collimating of light propagating from said substantial point source in said first optical channel are performed using a collimating lens inserted between said substantial point source and said display surface.

55. The method according to claim 54, wherein at least one element selected from said collimating lens, said first imaging element, said field lens, and said first eyepiece lens includes at least one diffractive surface.

56. The method according to claim 55, wherein said at least one element includes at least one continuous-profile Fresnelled refractive surface.

57. The method according to claim 54, wherein at least one element selected from said collimating lens, said first imaging element, said field lens, and said first eyepiece lens includes at least one continuous-profile Fresnelled refractive surface.

58. The method according to claim 57, wherein said at least one element is configured for color undercorrection.

59. The method according to claim 55, wherein said at least one element is configured for color overcorrection.

60. The method according to claim 54, wherein said collimating lens is color undercorrected and said first imaging element is color overcorrected, such that the color overcorrection of said first imaging element offsets the color undercorrection of said collimating lens, thereby producing a color corrected image at a transform plane.

61. The method according to claim 54, wherein said first imaging element is color overcorrected and first eyepiece lens is substantially color uncorrected, such that said first image is color corrected.

62. The method according to claim 61, wherein said collimating lens is color undercorrected, and said first imaging element is color overcorrected such that the color overcorrection of said first imaging element offsets the color undercorrection of said collimating lens, thereby producing a color corrected image at a transform plane.

63. The method according to claim 45, further comprising:
collecting ambient light over an ambient field of view;
measuring said collected ambient light intensity with a photodetector;
generating an ambient light output signal in response to said measured ambient light intensity; and
applying said ambient light output signal to adjust the intensities of said first and second light sources automatically in response to the intensity of said ambient light.

64. The method according to claim 42, further comprising positioning an aperture stop in said first beam proximate to a transform plane located between said first imaging element and said first intermediate image plane, wherein said aperture stop improves display contrast by blocking glare from stray and scattered light and reduces graininess by blocking higher-order spatial frequency harmonics arising from diffraction at a sub-pixel structure of said display device, thereby improving image quality.

65. The method according to claim 42, further comprising directing said first beam onto at least one off-axis optical element.

66. The method according to claim 65, further comprising reflecting said first beam from at least one reflective optical element, thereby producing a folded beam configuration.

67. The method according to claim 66, wherein at least one said reflective surface incorporates total internal reflection.

68. The method according to claim 66, wherein said display device is an optically reflective microdisplay.

69. The method according to claim 66, wherein the field of view of said biocular video display is limited laterally to allow peripheral vision of the surrounding environment.

70. The method according to claim 69 wherein corrective peripheral eye lens segments are interchangeably attached to a structure supporting said biocular video display.

71. The method according to claim 70, wherein said structure is configured for head-mounted display viewing.

72. The method according to claim 70, wherein said corrective peripheral eye lens segments are formed of injection-molded plastic.

73. The method according to claim 72, wherein said corrective peripheral eye lens segments are interchangeably attached to said structure by means of integrally molded snap fasteners.

74. The method according to claim 69, further comprising:
collecting ambient light over an ambient field of view, said ambient field of view approximating the field of view of said allowed peripheral vision;
measuring said collected ambient light intensity with a photodetector;
generating an ambient light output signal in response to said measured ambient light intensity; and
applying said ambient light output signal to adjust the intensities of said first and second beams of light automatically in response to the intensity of said ambient light.

75. A head-mounted display viewing structure, comprising:
a biocular viewing system centrally disposed within said structure, further comprising a single display device having a substantially planar display surface, a first optical channel having a first beam generated by a first light source, a second optical channel having a second beam generated by a second light source different from said first light source, said first and second optical channels being mutually disposed such that said first beam and said second beam are angularly displaced from one another and intersect with one another at said display surface; and
peripheral vision means laterally displaced relative to said biocular viewing system, wherein said peripheral vision means comprises corrective eye lenses interchangeably attachable to said structure.

76. The head-mounted display viewing structure according to claim 75, wherein:
said corrective eye lenses are formed of injection-molded plastic; and
said corrective eye lenses are interchangeably attachable to said structure by means of integrally molded snap fasteners.

77. The head-mounted display viewing structure according to claim 75, further comprising a photodetector disposed to measure the intensity of ambient light over a field of view approximating the field of view of an observer through said peripheral vision means.

78. A method of producing a time-averaged true stereographic image display using a single display device, comprising:
generating a first light beam from a first light source in a first optical channel;
generating a second light beam from a second light source in a second optical channel;
applying a video image signal to said single display device having a display surface disposed such that said first light beam and second light beam intersect one another at said display surface; and sequentially activating said first and second light sources in synchronism with corresponding sequential video signals to said display device for respective said first and second optical channels.

79. A method of producing a time-averaged biocular color image display using a single display device, comprising:

generating a first light beam from a first light source in a first optical channel;

generating a second light beam from a second light source in a second optical channel;

wherein said first and second light sources each comprise multiple light emitting diodes producing light of differing colors;

applying a video image signal to said single display device having a display surface disposed such that said first light beam and second light beam intersect one another at said display surface; and sequentially activating said light emitting diodes producing light of differing colors in synchronism with corresponding sequential video color signals to said display device.

80. The method according to claim 79, further comprising sequentially activating said first and second light sources in synchronism with corresponding sequential video signals to said display device for respective said first and second optical channels, thereby producing a true stereographic color image.

* * * * *